United States Patent Office 2,786,629
Patented Mar. 26, 1957

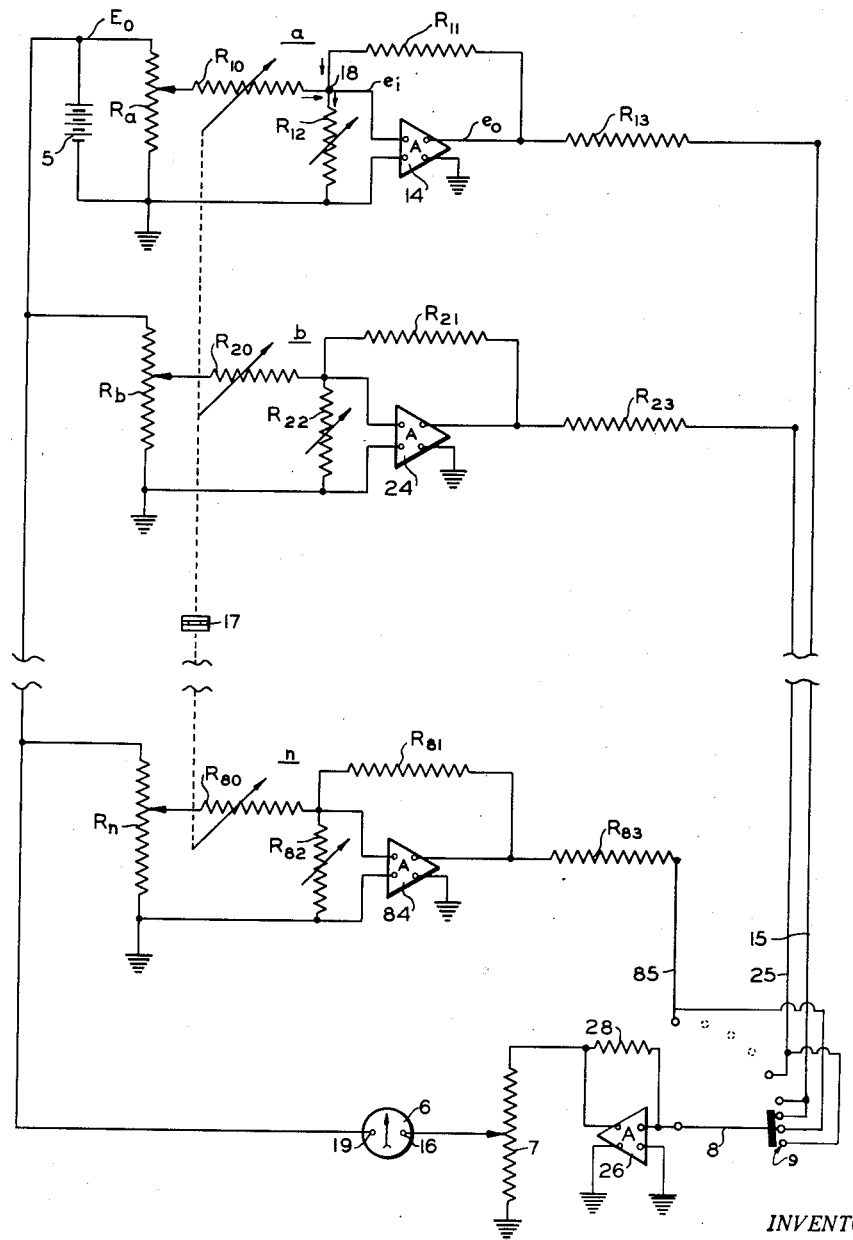

2,786,629
ELECTRICAL COMPUTER

Raymond G. Piety, Bartlesville, Okla., assignor to Phillips Petroleum Company, a corporation of Delaware Application March 16, 1951, Serial No. 215,881

9 Claims. (Cl. 235—61)

This invention relates to computers. In one specific aspect it relates to vapor-liquid equilibrium computers. In another specific aspect it relates to electrical analog circuits for solving mathematical problems.

In many practical operations in refining, chemical and other related industries, it is often of great importance to determine the composition and amount of liquid and vapor phases in a vapor-liquid equilibrium mixture. In general, the overall composition and total quantity of the mixture are known, from which data the total number of mols in the mixture and the total mol fraction of each component in the mixture may readily be calculated. Furthermore, the equilibrium constant for each component for the particular temperature and pressure involved are either known or may be calculated readily from known data. The computer of this invention upon being supplied the equilibrium constant of each component at the temperature and pressure involved and the total mol fraction of each component in the mixture calculates the mol fraction of each component in the liquid phase and the mol fraction of each component in the vapor phase. Knowing the mol fractions, the parts by weight or percentage of each component in the vapor and liquid phase may easily be determined if it is necessary to do so.

The computer circuits described herein, however, are not restricted to the solution of the vapor-liquid equilibrium problem alone, but may also be utilized to solve any other mathematical equation having a similar form.

It is an object of this invention to provide an improved computer capable of solving vapor-liquid equilibrium problems.

It is a further object to provide electrical circuits analogous to mathematical equations to be solved.

It is a still further object to provide a computer which is rapid and reliable in operation, of simplified construction and operation, and which utilizes a minimum number of circuit components.

Various other objects, advantages, and features of this invention will become apparent from the following detailed description of a preferred embodiment of the invention when taken in conjunction with the accompanying drawing which shows a schematic circuit diagram of the overall computer assembly.

With reference to a vapor-liquid mixture containing several components, it has been found that by associating with the individual components functional characteristics describing their individual behavior, phase properties of the composite mixture can be predicted by mathematical computation. These characteristics have been termed equilibrium constants and are defined by the general equation:

$$K_j = \frac{y_j}{x_j} \tag{1}$$

where $K_j$ is the equilibrium constant of the $j$th component, which represents available and measurable properties of the individual components of the mixture, $y_j$ is the mol fraction of that component in the vapor phase, and $x_j$ is the corresponding mol fraction in the coexisting liquid phase. In a vapor-liquid mixture containing several components, each component does not behave independently of the other components with regard to distribution between the gas and liquid vapor. In particular, the following relationships hold for each component in the vapor-liquid mixture:

$$x_j = \frac{z_j}{1+v(K_j-1)} \tag{2}$$

and $$y_j = \frac{K_j z_j}{1+v(K_j-1)} \tag{3}$$

where $x_j$ represents the mol fraction of a component in the liquid phase, $y_j$ represents the mol fraction of said component in the vapor phase, $v$ is the total mol fraction of vapor in the entire mixture, $z_j$ is the total mol fraction of said component in the entire mixture and $K_j$ is the equilibrium constant of said component at the temperature and pressure under consideration. The basic unknown in Equations 2 and 3 is $v$, and evaluation of $v$ may be obtained upon consideration that in a mixture containing several components, the sum of the mol fractions in the liquid phase is 1 and, similarly, the sum of the mol fractions in the vapor phase is 1, that is, $$x_1+x_2+\cdots+x_n=1 \tag{4}$$

and $$y_1+y_2+\cdots+y_n=1 \tag{5}$$

where there are $n$ components in the mixture. Substituting Equations 4 and 5 in equations 2 and 3, we have $$\sum_{j=1}^{n}\frac{z_j}{1+v(K_j-1)}=1 \tag{6}$$

and $$\sum_{j=1}^{n}\frac{K_j z_j}{1+v(K_j-1)}=1 \tag{7}$$

a solution of which can be obtained from a computer constructed in accordance with the present invention.

With reference to the drawing there is shown a wiring diagram of a plurality of identical computer units $a, b, \ldots, n$, one for each component in the mixture under analysis. For purposes of illustration it has been assumed that $n$ is 8 although this is by no means critical and a mixture containing any number of components may be analyzed by this computer. The total mol fractions $z_1, z_2, \ldots, z_n$ of the respective components are set upon dials (not shown) connected directly to the contactors of potentiometers $R_a, R_b, \ldots, R_n$, respectively, and the equilibrium constants $K_1, K_2, \ldots, K_n$ are likewise set upon dials (not shown) connected to variable resistors $R_{12}, R_{22}, \ldots, R_{82}$, respectively. In addition, variable resistors $R_{10}, R_{20}, \ldots, R_{80}$ are ganged to one another by means of mechanical coupling 17 so that said resistors vary simultaneously, and a dial (not shown) connected to said coupling gives a reading of $v$, the desired solution of Equation 6, at balance. Each computer unit is supplied by an input voltage $E_0$ taken from battery 5, one terminal of which is grounded. The output voltage of each unit is connected through respective isolating resistors $R_{13}, R_{23}, \ldots, R_{83}$ to a common switch terminal 9 which is connected through switch 8 and summing amplifier 26 to an end terminal of voltage dividing potentiometer 7. The contactor of potentiometer 7 is connected through galvanometer 6 back to battery 5, thereby completing the overall electrical circuit. Switch 8 in addition to connecting common terminal 9 to potentiometer 7 may be selectively connected to either conductor 15, 25, ..., 85, so that each individual output voltage of the various computer units may be compared against the source voltage of battery 5 in place of the sum of these voltages as represented by common terminal 9. If fewer components are present in a given mixture under analysis than units in a given computer, the units not needed may effectively be removed from the overall circuit by grounding the contactor of potentiometer $R_a$, $R_b$, etc. as the case may be.

In order to explain the operation of the computer circuit, reference is made to the $a$ unit of the combination, it being understood that the $b, \ldots, n$ units operate in like manner. Values of resistor $R_{12}$ and potentiometer $R_a$ are established as described above and a voltage $E_0$ supplied by battery 5 is applied across potentiometer $R_a$. The preselected fraction of voltage $z_1E_0$ taken from potentiometer $R_a$ is applied across series connected resistors $R_{10}$ and $R_{12}$. The voltage $e_i$, taken with respect to ground, represents the voltage drop across said resistor $R_{12}$ and is applied to the input of voltage doubling amplifier 14. The output $e_0$ of said amplifier, also taken with respect to ground, is twice that of the input voltage $e_i$, and as will be explained hereinafter, this is an important requirement in the operation of the computer. The output of amplifier 14 is coupled to the input of said amplifier through resistor $R_{11}$. The output of computer $a$ is connected through isolating resistor $R_{13}$, which is of high ohmic value as compared to the other resistors within the unit, to terminal 9, which is common to each individual output unit, said terminal 9 being connected back to battery 5 as above described in order to complete the electrical circuit.

Assuming that the current flow at junction 18 is in the direction indicated by the small arrows, letting $z_1E_0$ represent the voltage taken across potentiometer $R_a$, and further remembering that $e_0$ is equal to $2e_i$, the mathematical representation of said current flow in accordance with Kirchoff's law becomes:

$$\frac{(z_1E_0 - e_i)}{R_{10}} - \frac{e_i}{R_{12}} + \frac{(2e_i - e_i)}{R_{11}} = 0 \quad (8)$$

It is assumed there is no current flow to the non-grounded input terminal of amplifier 14. Letting $g$ represent the conductance of each resistor having the same subscript the Equation 8 may be simplified as $$e_i(g_{10} + g_{11} + g_{12}) - g_{10}z_1E_0 - g_{11}2e_i = 0 \quad (9)$$

which when solved for $e_i$ gives $$\frac{g_{10}z_1E_0}{g_{10} + g_{12} - g_{11}} \quad (10)$$

By expressing the relationship between $R_{11}$ and $R_{12}$ as $$R_{11} = K_1 R_{12}$$

or $$g_{12} = K_1 g_{11} \quad (11)$$

where $K_1$ is a proportionality constant relating to said resistors, Equation 10 becomes $$e_i = \frac{z_1 E_0}{1 + \frac{R_{10}}{R_{11}}(K_1 - 1)} \quad (12)$$

which is of essentially the same form as Equation 2. A comparison of Equations 2 and 12 shows that the right hand term of Equation 12 is equal to the right hand term of Equation 2 multiplied by the battery voltage $E_0$, if $v$ is represented as being equal to the ratio $$\frac{R_{10}}{R_{11}}$$

Thus $e_i$ for each computer unit is numerically equal to the $x$-fraction of that unit multiplied by the battery voltage $E_0$, or expressed mathematically $$E_0 x_j = e_i \quad (13)$$

As indicated above, in operating the computer to solve a particular problem the potentiometers $R_a$, $R_b$, $\ldots$, $R_n$ are set to the indicated $z_1$ values, resistors $R_{12}$, $R_{22}$, $\ldots$, $R_{82}$ are set to the corresponding $K_1$ values, switch 8 is connected with the common output terminal 9 and resistors $R_{10}$, $R_{20}$, $\ldots$, $R_{80}$ are varied by means of ganged coupling 17 until a zero deflection on galvanometer 6 is obtained, the contactor of potentiometer 7 being held at its midpoint throughout the operation. Terminal 9 is thereby at a voltage equal to the average of the individual output voltages as expressed by the term $$\frac{1}{N}\Sigma 2e_i$$

A summing amplifier 26 is positioned between switch 8 and potentiometer 7 and is so adjusted that the sum of the output voltages of the individual units, that is, $\Sigma 2e_i$, is applied across potentiometer 7. Such a summing amplifier is provided by using a feedback resistor 28 which has the same value as each of the equal isolating input resistors $R_{13}$, $R_{23}$, $\ldots$, $R_{83}$.

For reasons which will become apparent during the following discussion the voltage applied to terminal 16 of galvanometer 6 is maintained at one-half the total voltage applied across potentiometer 7 as mentioned before, thereby making the voltage at terminal 16 of galvanometer 6 equal to $\Sigma e_i$. The voltage at terminal 19 of galvanometer 6 is the battery voltage $E_0$; therefore, at the balance point indicated by zero deflection of said galvanometer the two voltages applied to terminals 19 and 16, respectively, are equal making $$\Sigma e_i = E_0 \quad (14)$$

Further, by substituting Equation 13 in Equation 14, the following relationship is obtained:

$$\Sigma x_j E_0 = E_0 \quad (15)$$

from which the $E_0$'s may be cancelled leaving $$\Sigma x_j = 1 \quad (16)$$

which is the condition imposed by Equation 4. Thus, the solution for $v$ is obtained from the calibrated dial connected to ganged resistors $R_{10}$, $R_{20}$, $\ldots$, $R_{80}$ which indicates the ratio of $$\frac{R_{10}}{R_{11}} = \frac{R_{20}}{R_{21}} = \cdots = \frac{R_{80}}{R_{81}}$$

the term of Equation 12 which represents $v$ in Equation 2.

Once the computer has been balanced as indicated above, the value of the individual mol fractions in the liquid phase $x_j$ may directly be obtained by means of switch 8 and potentiometer 7. For example, switch 8 may be connected to conductor 15 thereby applying the output voltage of unit $a$ to the input of amplifier 26. Since feedback resistor 28 is now equal to the input resistor $R_{13}$, amplifier 26 acts as a unity-gain amplifier so that the output voltage of unit $a$ is applied directly across potentiometer 7. The balancing circuit will no longer be at balance requiring an adjustment of the contactor of potentiometer 7 in order to restore the circuit to a balanced condition as indicated by a zero glavanometer deflection. Potentiometer 7 is calibrated to directly indicate the $x_1$-fraction for said $a$ unit when a balance condition is restored. Similarly, the remaining $x$-fractions $x_2, \ldots, x_n$ may be obtained by connecting switch 8 to the corresponding computer unit connected thereto through conductors 25, $\ldots$, 85, respectively, and reading corresponding balance points on potentiometer 7.

Once the values of the $x$-fractions are obtained there are two possible ways by which the values of the corresponding $v$-fractions, the individual fractions in the vapor phase, can be calculated. The first is to simply multiply the individual values of $x_j$ by the corresponding values of $K_j$ as can be conveniently done either manually or in a conventional calculating machine. On the other hand, Equation 3 can be solved in the same manner as for the solution of Equation 2 described herein. If this method is resorted to, the values of $K_jz_j$ are inserted in the $R_a$, $R_b$, ..., $R_n$ potentiometer in place of the $z_j$ values before mentioned. Once this has been done the balancing operation is made in the same manner as before indicated for the $x$-fractions. The latter should be obvious upon consideration of Equations 2 and 3 since the right hand term of Equation 3 is equal to the right hand term of Equation 2 multiplied by the equilibrium constant $K_j$.

While this invention has been described in connection with a preferred embodiment, it should be understood that this description is illustrative only and is not intended to limit the invention. It should be apparent to those skilled in the art that various modifications can be resorted to without departing from the scope of this invention. For example, the voltage doubling amplifier could readily be replaced by any other type of device capable of producing a voltage twice that of the voltage $e_1$ applied across resistor $R_{12}$. This could take the form of the voltage $e_1$ being read upon a voltmeter connected across resistor $R_{12}$, and a variable voltage source could then be adjusted to manually produce a voltage $e_0$ having a magnitude twice that of $e_1$. A second alternative could conceivably be a servomechanism attached to operate a potentiometer such that an output voltage equal to twice the input voltage is always maintained. While this invention has been described with reference to a direct current voltage source 5, it should be apparent that entirely satisfactory results can be obtained by using an alternating current voltage source in place of said direct current source. If an alternating current voltage source is used, the various resistors throughout the circuit must be pure resistances; otherwise both construction and operation of the computer are the same as described for the direct current voltage source.

I claim:

1. A computer circuit comprising a voltage source applied across a potentiometer, a resistance unit including first and second series connected variable resistors, the end terminals of said resistance unit being connected respectively to the contactor of said potentiometer and to one end terminal of said potentiometer, means for establishing a reference voltage of magnitude twice that of the voltage drop across said second resistor, a coupling resistor connected between the junction between said first and second resistors and one terminal of said reference voltage, and means connecting the second terminal of said reference voltage to the end terminal of said resistance unit connected to the end terminal of said potentiometer.

2. In a computer, in combination, a voltage source applied across a potentiometer, a resistance unit including first and second series connected variable resistors, the end terminals of said resistance unit being connected respectively to the contactor of said potentiometer and to one end terminal of said potentiometer, voltage amplifying means for establishing an output voltage of magnitude twice the input voltage applied thereto, means for connecting the input terminals of said voltage amplifying means to the end terminals of said second resistor, a coupling resistor connected between the junction between said first and second resistors and one output terminal of said voltage amplifying means, and means for comparing said output voltage with said voltage source.

3. A computer circuit comprising a voltage source applied across a potentiometer, a resistance unit including first and second series connected variable resistors, the end terminals of said resistance unit being connected respectively to the contactor of said potentiometer and to one end terminal of said potentiometer, a vacuum tube amplifying circuit having an amplification factor of two, the input of said circuit being the voltage appearing across said second resistor, and a coupling resistor connected between the junction between said first and second resistors and the output of said voltage amplifying means, the second output terminal of said voltage amplifying means being connected to the end terminal of said second resistor connected to said potentiometer.

4. A computer comprising, in combination, a plurality of units constructed in accordance with claim 2, each of said units being connected across a common voltage source, means for summing the output voltages of the amplifying means of each of said units, means for halving said voltage sum, means for comparing said halved voltage sum with said voltage source, and means for simultaneously varying each of said first resistors in said units a like amount until said halved voltage is equal to said common voltage source.

5. A computer for evaluating $v$ in an equation of the form $$\sum_{j=1}^{n}\frac{z_j}{1+v(K_j-1)}=1$$

where $z_j$ and $K_j$ are known quantities, and $n$ is a positive whole number, comprising, in combination, $n$ units constructed in accordance with claim 2 having a common voltage source, said potentiometer settings representing a respective $z_j$ value for each unit, said second resistor settings representing a respective $K_j$ value for each unit, and the ratio of the ohmic value of said first resistor settings to the ohmic value of said coupling resistors for each of said units being a constant representing $v$, means for summing the output voltages of the amplifying means of each of said units, means for halving said voltage sum, means for comparing said halved voltage with said voltage source, and means for simultaneously varying each of said first resistors in each of said units until said halved voltage is equal to said common voltage source.

6. A computer comprising, in combination, a plurality of units constructed in accordance with claim 2, each of said units having a common voltage source, means for summing the output voltages of the amplifying means of each of said units, means for halving said voltage sum, means for comparing said halved voltage sum with said voltage source, means for simultaneously varying each of said first resistors in said units a like amount until said halved voltage is equal to said common voltage source, and switching means for selectively comparing the output voltage of the amplifying means of each given unit with said common voltage source in place of said output voltage sum.

7. A computer comprising, in combination, a voltage source; a plurality of like units each including means for establishing a first voltage representing a preselected fraction of said source voltage, means for etablishing a second voltage representing a selected fraction of said first voltage, means for establishing a third voltage of magnitude of twice that of said second voltage; means for summing said third voltages of each of said units; means for comparing selectively the sum of said third voltage and each of said third voltages individually with said source voltage; and means for varying simultaneously the means for establishing the second voltages in each of said units until the sum of said third voltages of twice that of said source voltage.

8. A computer for solving phase equilibrium problems comprising in combination a common voltage source, a plurality of similarly constructed units, each having a potentiometer applied across said common voltage source, said potentiometer setting representing the mol fraction of a given component in the mixture, first and second variable resistors connected to one another, the free terminal of said first resistor being connected to the contactor of said potentiometer and the free terminal of said second resistor being connected to an end terminal of said potentiometer, said second resistor setting representing the equilibrium constant of a given component in the mixture, a voltage amplifier having an amplification factor of 2, the input of said amplifier being the voltage across said second resistor, a coupling resistor connected between the junction of said first and second resistors and the output of the said voltage amplifier; means for summing the output voltages of the amplifiers in each of said units, means for halving the sum of said output voltages, means for comparing said halved voltage sum with said source voltage, means for simultaneously varying each of said first resistors in said units a like amount until said halved voltage sum is equal to said source voltage, said first resistor settings representing the mol fraction of vapor in the mixture, and means for selectively comparing the output voltages of the amplifiers of each of said units with said source voltage whereby the ratios of said last mentioned voltages represent the mol fraction of a corresponding component in the liquid phase.

9. A computer for solving phase equilibrium problems comprising a common voltage source; a plurality of similarly constructed units, each having a potentiometer applied across said common voltage source, the potentiometer setting representing the mol fraction of a given component in the mixture, first and second variable resistors connected to one another, the free terminal of said first resistor being connected to the contactor of said potentiometer and the free terminal of said second resistor being connected to an end terminal of said potentiometer, the setting of said second resistor representing the equilibrium constant of a given component in the mixture, a voltage amplifier having an amplification factor of 2, the input of said amplifier being the voltage across said second resistor, a coupling resistor connected between the junction of said first and second resistors and the first output terminal of said voltage amplifier, a first output terminal of said unit, and an isolating resistor connected between the first output terminal of said voltage amplifier and the first output terminal of said unit, the second output terminal of said unit being the second output terminal of said voltage amplifier; a summing amplifier; switching means for selectively connecting the input terminals of said summing amplifier to the output terminals of individual ones of said units and to the output terminals of all of said units simultaneously; an adjustable potential divider having the input terminals thereof connected to the output terminals of said summing amplifier to provide a second voltage which is one-half of the output voltage of said summing amplifier at a first setting; current indicating means connected between said voltage source and the output terminals of said potential divider to compare said common voltage with said second voltage; and means for varying simultaneously each of said first resistors in said units a like amount until said second voltage is equal to said common voltage when the output terminals of all of said units are connected simultaneously to the input terminals of said summing amplifier, the first resistor settings representing the mol fraction of vapor in the mixture, and the settings of said potential divider representing the mol fraction of a given component in the liquid phase when the unit representing said component is connected by said switching means to said summing amplifier and the reading of said current indicating means is zero.

References Cited in the file of this patent

UNITED STATES PATENTS

| | | |
|---|---|---|
| 2,469,628 | Bowman et al. | May 10, 1949 |
| 2,503,387 | Hartwig | Apr. 11, 1950 |
| 2,542,564 | Park | Feb. 20, 1951 |
| 2,582,474 | Bomburger et al. | Jan. 15, 1952 |
| 2,637,495 | Bubb | May 5, 1953 |
| 2,713,457 | Bubb | July 19, 1955 |

OTHER REFERENCES

An Automatic Simultaneous Equation Computer and Its Use in Solving Secular Equations, W. A. Adcock; "The Review of Scientific Instruments," vol. 19, No. 3; March 1948; pp. 181–187.

Details of the Simultaneous Equation Solver, E. A. Goldberg; "R. C. A. Review," vol. IX, No. 3; September 1948; pp. 394–405.